(12) United States Patent
Chiu

(10) Patent No.: US 6,925,358 B2
(45) Date of Patent: Aug. 2, 2005

(54) TOY ROBOT AND CONTROL SYSTEM THEREFOR

(76) Inventor: Shun Pui Andrew Chiu, Unit 08-12, 11th Floor, Harbour Crystal Centre, 100 Granville Road, Tsimshatsui East, Kowloon (HK)

( * ) Notice: Subject to any disclaimer, the term of this patent is extended or adjusted under 35 U.S.C. 154(b) by 81 days.

(21) Appl. No.: 10/372,901

(22) Filed: Feb. 26, 2003

(65) Prior Publication Data

US 2004/0167665 A1 Aug. 26, 2004

(51) Int. Cl.$^7$ .............................................. G06F 19/00
(52) U.S. Cl. ................. 700/245; 700/246; 700/247; 700/248; 700/249; 700/250; 446/175; 446/390; 446/444; 446/454; 318/568.11; 318/568.12; 318/568.16; 901/1; 901/15; 901/19; 901/23; 434/319
(58) Field of Search ................................. 700/245–250; 446/175, 390, 444, 454, 456; 318/568.11, 568.12, 568.16; 901/1, 15, 19, 23; 434/319

(56) References Cited

U.S. PATENT DOCUMENTS

| | | | | |
|---|---|---|---|---|
| 3,703,048 A | * | 11/1972 | Cooper | 446/336 |
| 4,078,316 A | * | 3/1978 | Freeman | 434/319 |
| 4,095,367 A | * | 6/1978 | Ogawa | 446/73 |
| 4,170,840 A | * | 10/1979 | Ogawa | 446/95 |
| 4,609,363 A | * | 9/1986 | Udagawa | 446/444 |
| 4,973,286 A | * | 11/1990 | Davison | 446/175 |
| 5,148,372 A | * | 9/1992 | Maiocco et al. | 700/182 |
| 5,209,695 A | * | 5/1993 | Rothschild | 446/175 |
| 5,871,385 A | * | 2/1999 | Hippely et al. | 446/424 |
| 6,611,738 B2 | * | 8/2003 | Ruffner | 701/23 |
| 6,764,373 B1 | * | 7/2004 | Osawa et al. | 446/175 |

* cited by examiner

*Primary Examiner*—Thomas G. Black
*Assistant Examiner*—McDieunel Marc
(74) *Attorney, Agent, or Firm*—Burns Doane Swecker & Mathis, LLP

(57) ABSTRACT

A toy robot system includes a toy robot and a surface over which the robot can move. The surface is constructed from a number of modules of various types that may be joined together. Each module (except for spacer modules) includes at least one track segment along which the robot may move. Each module is square and each track segment extends from the center of the module to one side. A code readable by the robot is provided at the beginning of each segment so that the robot knows what type of module it is entering, and a code is provided at the center of each module so that the robot can calculate its position.

8 Claims, 8 Drawing Sheets

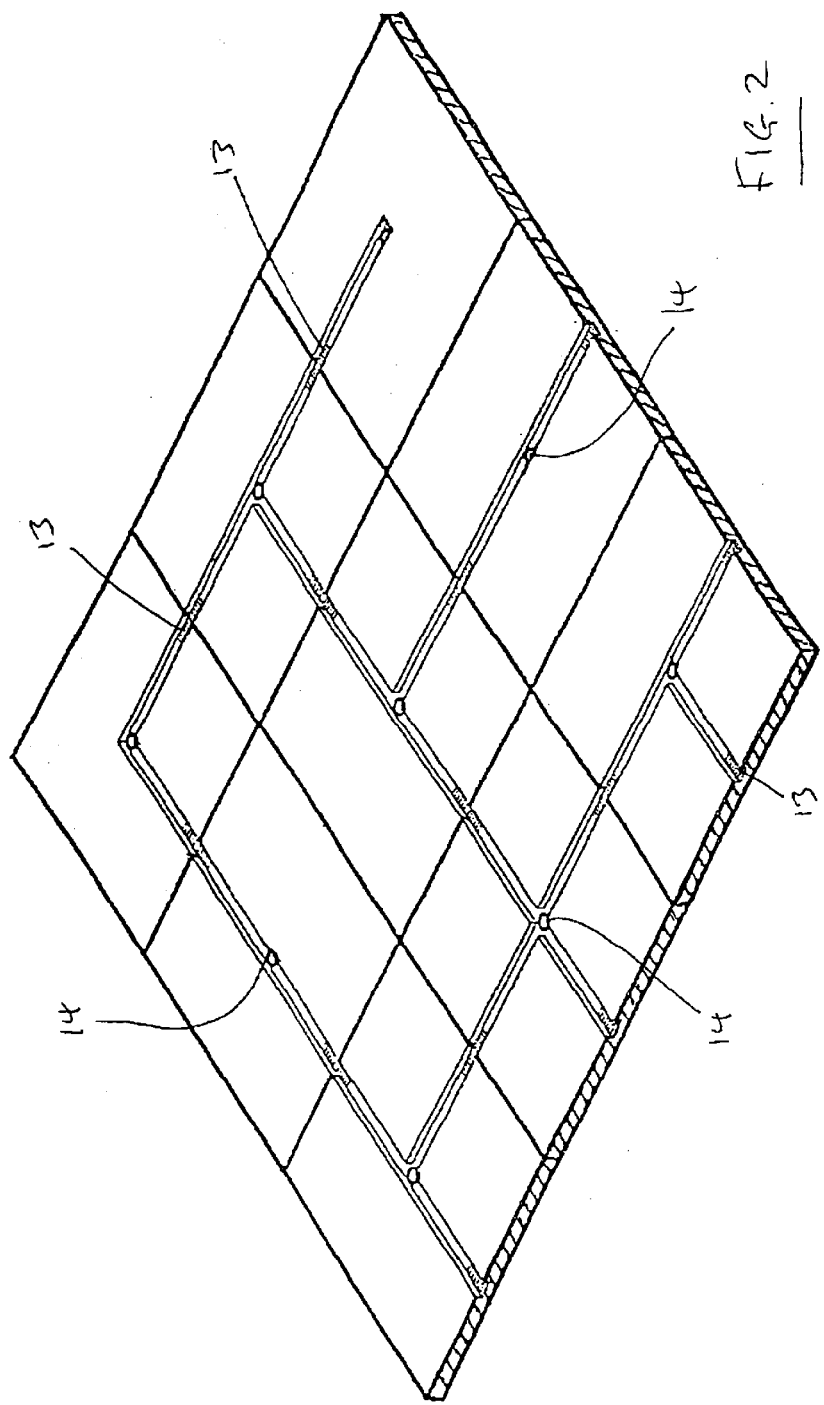

TOY ROBOT AND CONTROL SYSTEM THEREFOR

FIELD OF THE INVENTION

This invention relates to a toy robot and to a control system therefor, and in particular to a control system that allows an environment for the robot to be constructed, and in which environment the toy robot is enabled to move in a controlled manner. In particular the present invention relates to a toy robot and control system that allows a simple toy robot to be constructed at relatively low cost but which can move under its own control in the constructed environment.

BACKGROUND OF THE INVENTION

A great number of toys exist that can move in a controlled manner. Traditional toys for example include toy railway sets and toy racing car sets. In such toys, railway tracks or racing tracks are constructed and toy trains or racing cars are guided in circuits by the tracks. The movement of the toy trains or cars, however, is normally only along the fixed track.

Another well-known type of toy is the radio-controlled toy, especially radio-controlled toy cars for example. A radio-controlled toy car can be moved over a surface by a child issuing commands through a radio frequency remote control system.

Also known are toy robots. A toy robot is provided with means for propelling itself over a surface without the direct control of a child. However, if the toy robot is very simple, then the range of movements of the toy robot is limited because without user intervention it will hit obstacles that may damage the toy and will impede its progress. Children will inevitably tend to tire of such toys quite quickly.

A child's interest in a robot-like toy can be increased if the toy is provided with a degree of in-built intelligence such that it can identify obstacles and take evasive action. For example, in principle, a toy robot could be provided with some form of camera and visual recognition system so that obstacles can be identified and evasive action taken. However, this requires quite complicated (and therefore expensive) processing means and such a robot-like toy would be closer to a "real" robot in an industrial and scientific application than a child's toy. The cost would become prohibitive.

SUMMARY OF THE INVENTION

An object of the invention is to provide a toy robot and control system therefor that can provide a robot-like toy for a child that is capable of moving under its own control (or at least without the direct control of a child), but which can be fabricated at relatively low cost.

According to the present invention there is provided a toy robot system comprising, at least one toy robot and a surface over which said robot is adapted to move, wherein said surface is constructed from a plurality of modules selected from a set of predefined module types including tracks along which a toy robot may move, wherein each said module is provided with identification means readable by a said robot that identifies the type of module a robot is entering, a check-point in the center of the module detectable by said robot and control means for controlling a said robot in response to the type of module identified by said robot.

In a preferred embodiment at least some of the predefined module types are asymmetrical and the identification means further identifies the orientation of the module.

Preferably each module is further provided with a recognition code readable by a robot to indicate to the robot that it is entering or leaving a module.

The modules are preferably square and formed with at least one track segment extending from the centre of the module to a side thereof.

As an example, the set of predefined types of module may comprise five types of module; a first type having a single track segment, a second type having two track segments arranged in a straight line, a third type having two track segments arranged at right angles, a fourth type having three track segments, and a fifth track segment having four track segments. It is also preferable to provide a further type of module having no track and comprising a spacer module.

The identification code may provided associated with each track segment of a module at the end of each said track segment adjacent the edge of a module. A preferred manner of providing the identification code is for each track segment to comprise a groove in a surface of a module, and the identification code may then comprise a series of projections in the groove, and the toy robot includes a downwardly extending groove following pin means adapted to engage the projections and move vertically in response thereto, a transducer means being provided to convert this movement into an electrical signal.

The control means may be provided as part of the toy robot, or may be remote from the toy robot.

Viewed from another broad aspect the present invention also provides a toy robot system comprising, at least one toy robot and a surface over which said robot is adapted to move, wherein said surface is constructed from a plurality of square modules each said module being formed with at least one track segment along which a toy robot may move, each said at least one track segment extending from the center of said square module to one side of said module, and wherein means are provided readable by said toy robot for indicating when the robot is at the center of a said module.

BRIEF DESCRIPTION OF THE DRAWINGS

Some embodiments of the invention will now be described by way of example and with reference to the accompanying drawings, in which:

FIG. 2 shows a perspective view of one possible environment that could be constructed using the modules of FIGS. 1(a)–(f), FIGS. 3(a) and (b) illustrate the form of codes provided in track segments of the modeules, FIGS. 4(a) and (b) illustrate the signals generated by the codes of FIGS. 3(a) and (b)

DETAILED DESCRIPTION OF PREFERRED EMBODIMENTS

An important aspect of the present invention at least in its preferred forms is the provision of an "environment" for a toy robot (or robots) in which the range of movement of the toy robot is restricted such that minimum processing is needed, but which at the same time can be constructed to provide a variety of possible physical situations in which a toy robot can move, thus maximizing a child's interest in the toy while minimizing the computer processing power that is required. This objective is achieved by providing a number of modules that can be assembled in different combinations to form the robot environment. Each module may be formed with one or more track segments such that when the modules are assembled together to form the environment, the track segments connect together to form a network of tracks along which a toy robot may move.

Figure 1A:
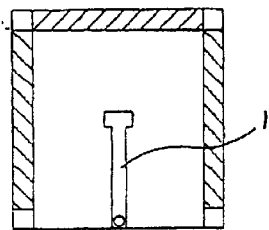
FIGS. 1(a)–(f) show six different types of modules for forming a toy robot environment according to an embodiment of the invention.
Figure 1B:
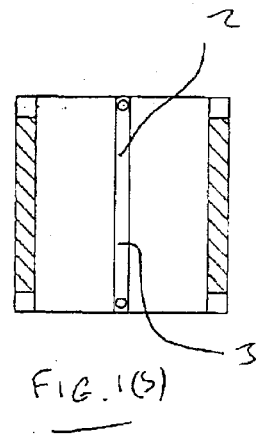
Figure 1C:
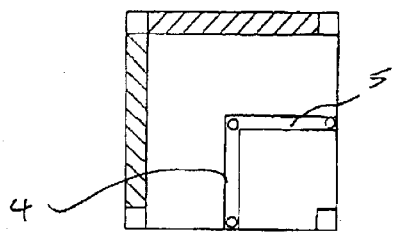
Figure 1D:
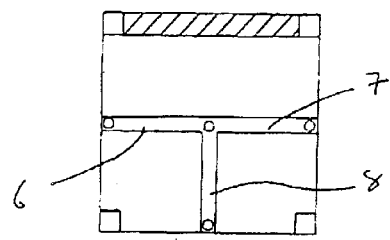
Figure 1E:
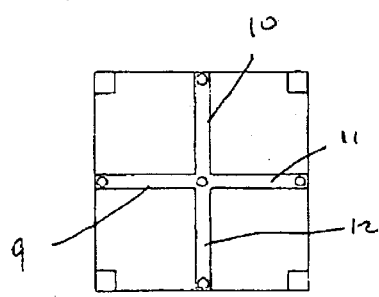
Figure 1F:
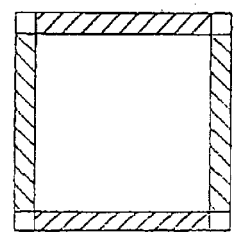

FIGS. 1(a) to (f) show six basic types of units with the units shown in FIGS. 1(a)–(e) all including at least one track segment, while the unit shown in FIG. 1(f) has no track segment and is instead provided as a spacer element. It should also be noted that each module shown in FIGS. 1(a)–(f) is square, and each track segment extends perpendicularly from a point halfway along one side of the square to the middle of the square. Each track segment is formed as a groove recessed in the surface of the otherwise generally planar modules.

FIG. 1(a) shows a first module formed with a single track segment 1 that stops at the center of the module. This module may be termed a "dead end" as any toy robot that moves along this track segment towards the center of the unit clearly cannot progress further.

FIG. 1(b) shows a second module formed with two track segments 2, 3 extending from opposite sides of the module so as to form a straight track extending across the unit from one side to the opposite passing through the center. This module may therefore be termed a "straight".

FIG. 1(c) shows a third module formed with two track segments 4, 5 extending from adjacent sides of the module and meeting at the center so as to form a right angled track extending from one side of the unit to an adjacent side. This module may therefore be termed a "corner".

FIG. 1(d) shows a fourth module formed with three track segments 6, 7 and 8 all meeting at the center of the unit. Track segments 6 and 7 extend from opposite sides of the unit, while track segment 8 extends from one of the other two sides so as to be perpendicular to the track formed by segments 6 and 7 to form a T-junction. This module may therefore be termed a "T-junction".

FIG. 1(e) shows a fifth module formed with four track segments 9, 10, 11 and 12 extending respectively from each side of the module and meeting in the center to form a cross. This module may therefore be termed a "cross".

All six modules are square planar members of the same size and can be joined together at least along sides that are not provided with a track segment. The modules are preferably designed so that they can be joined together, but can easily be separated again so that a different environment can be created. The interconnection between two modules can be achieved in any desired manner, but preferably a connection between two modules can be obtained in a building-block manner by forming those sides of the modules that are not provided with a track segment, with regular protrusions parallel to the sides which protrusions may engage the undersurface of a building block that extends over the sides of two adjacent units so as to join them together. In FIGS. 1(a)–(f) the sides of the modules shown with hatched lines indicate such connecting means. Furthermore each of the four corners of the square modules (even on sides formed with a track segment) may be provided with connecting means so that modules can be connected together.

It will readily be understood that the various different types of modules can be combined together so that the track segments of the different modules connect to each other to form continuous tracks in a maze like manner. FIG. 2 shows an example of how nine modules can be connected together, in this case in a 3×3 matrix or array, so as to form a series of different tracks. The example of FIG. 2 does not include any spacer modules of the type shown in FIG. 1(f). In larger arrays such spacer modules may be used, though they would not be strictly essential as the toy robot cannot move through them at all. Their inclusion would be preferable, however, as they assist in providing a physical integrity to the collection of modules.

It should also be noted that in FIG. 2 the identification codes 13 are formed associated with the track segments as will be described further below, while circles 14 denote checkpoints indicating to a toy robot the center of a module as will be described below.

Figure 9:
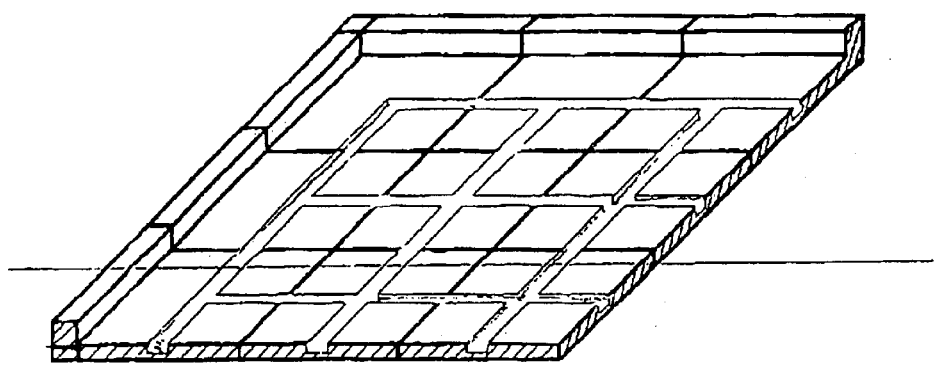
FIG. 9 is a part-sectional perspective view through another possible environment constructed in accordance with an embodiment of the invention.

FIG. 9 shows a part-sectional perspective view of a part of another possible assembled surface purely by way of illustration. In particular FIG. 9 shows a corner of a larger surface. The exact corner is defined by one corner module (of the type shown in FIG. 1(c)) and the sides of the corner are made up of T-shaped modules (FIG. 1(d)) which surround a number of cross-shaped modules (FIG. 1(e)). The outside edges of the T-shaped modules and the corner module may be provided with a wall built upon the protrusions to define a clearly limited edge to the surface.

Assembled together, as in FIG. 2, the modules form a surface over which, or an "environment" in which, a robot like toy may be allowed to move. The precise form of the toy robot may vary extensively. However, the toy robot should be provided with its own means of propulsion so that the toy robot can move over the surface of the modules. The toy robot may also be provided with some degree of computer processing capability, though the extent to which an individual toy robot will require processing capabilities will depend on whether processing is done within each toy robot or remotely as will be discussed further below. Each toy robot is also provided with means for reading codes that are provided on each module and which uniquely indicate to a toy robot the type of module, its orientation, and whether the toy robot is leaving or entering a particular module. These codes will now be described in detail referring again to FIGS. 1(a)–(e).

In total, the set of five predefined types of module formed with track segments (ie FIGS. 1(a)–(e)) a total of twelve different track segments. There is a single track segment 1 in the dead-end unit of FIG. 1(a), two track segments 2, 3 in the straight unit of FIG. 1(b), two track segment 4, 5 in the corner unit of FIG. 1(c), three track segments in the T-junction of FIG. 1(d), and finally four track segments in the cross of FIG. 1(c). A total of 12 track segments can therefore each be individually identified using a four-character binary code as follows:

| Unit | Track segment | Code |
|---|---|---|
| Dead End | 1 | 0000 |
| Straight | 2 | 0001 |
|  | 3 | 0010 |
| Corner | 4 | 0011 |
|  | 5 | 0100 |
| T-junction | 6 | 0101 |
|  | 7 | 0110 |
|  | 8 | 0111 |
| Cross | 9 | 1000 |
|  | 10 | 1001 |
|  | 11 | 1010 |
|  | 12 | 1011 |

These identification codes are provided at the beginning of each track segment (ie at the end of the track segment adjacent the side of the module) as shown in FIG. 2 by squares 13 and are provided in a form that can be read by the toy robot so that as the toy robot enters a new module the toy robot can identify not only the type of module, but also the orientation of that unit. For example, if the toy robot reads the code 0100 the toy robot knows not only that the module is a corner unit, but also that the corner is a left turn. On the other hand if the toy robot reads the code 0011 the toy robot knows that the module is a corner unit with a right turn. Similarly, if the toy robot reads the code 0111 it will know that it is entering a T-junction unit with a choice of a left or right turn, while if the toy robot reads the code 0101 it will know that it is entering a T-junction unit and will have a choice of turning right or going straight ahead.

The identification codes may be provided in any convenient manner. Possibilities include an optical code that can be read by an optical recognition means provided on the underside of the toy robot, or a magnetic code that can be read by a magnetic sensor on the toy robot. The present embodiment, however, provides a particularly simple and low cost method for presenting these codes and for allowing the codes to be read by the toy robot.

In the present embodiment the code is provided by way of portions of the grooved track segments being formed with upward projections. These upward projections may correspond to 1 in the binary code, while non-raised portions may correspond to binary 0. A further raised portion of the track segment is provided as an initialization code that can be recognized by a toy robot to tell the toy robot that it is entering a new module and that an identification code will follow.

In order to read these codes, as will be described in more detail below, the toy robot is formed with a downwardly projecting groove following pin that is sized so that it can extend into the recessed track segments towards the bottom of the track segment. The projecting pin is spring biased downwardly but can reciprocate along its axis. It will thus be understood that as the toy robot moves in a direction along a track segment, the pin may be caused to move up and down by the presence or otherwise of the projecting portions of the bottom of the track segments, and this vertical movement can be converted by a transducer into an electrical signal corresponding to the binary code.

Figure 3A:
Figure 3B:
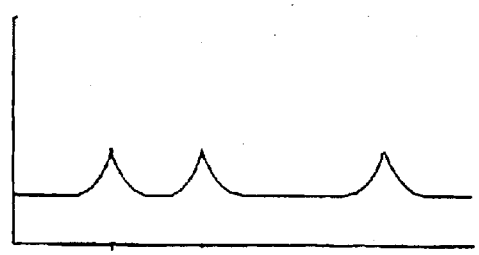
Figure 4A:
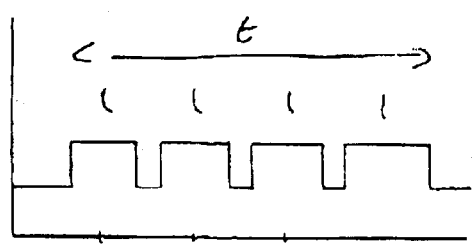
Figure 4B:
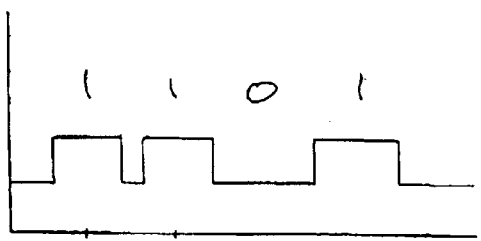

FIGS. 3(a) and (b) show respectively the projections from the bottom of a track segment corresponding to (a) a recognition code, and (b) the code 1101 (as an example of an identification code. FIGS. 4(a) and (b) show the corresponding electrical signals that are generated by the projections of FIGS. 3(a) and (b). Both the recognition code and the identification code are the same length t. The recognition code is simply a constant binary 1 for the time t (which would be equivalent to identification code 1111 which is not in fact required). The identification code also occupies time t with each digit within the four-digit binary code occupying time t/4. The recognition code serves both to tell the toy robot that it is entering (or leaving as the case may be) a module, and also serves to synchronise the toy robot so that no matter what speed the toy robot is traveling it knows what the time period t is that the identification code will occupy.

Figure 5:
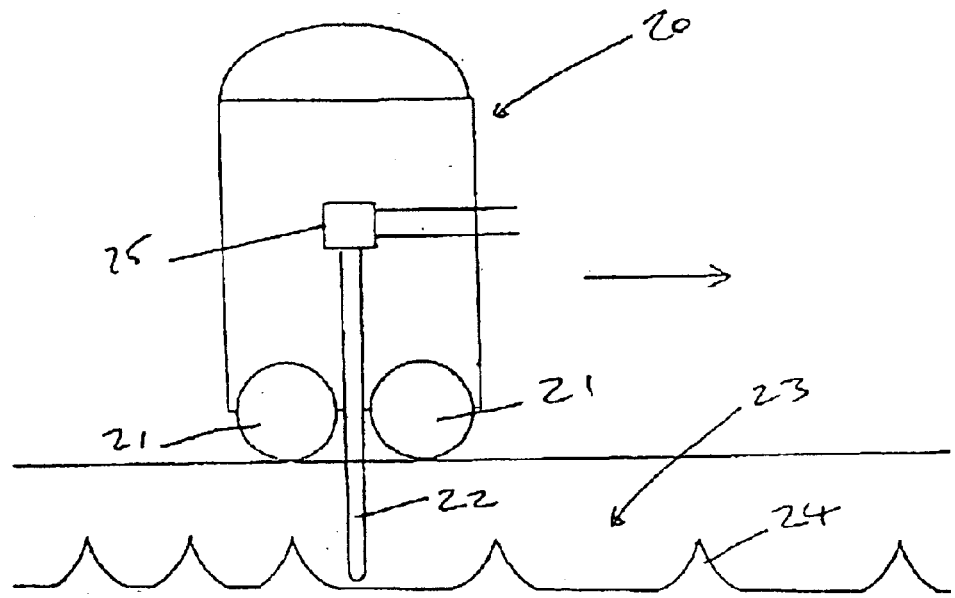
FIG. 5 is a side view of a toy robot for use in a system according to an embodiment of the invention.
Figure 6:
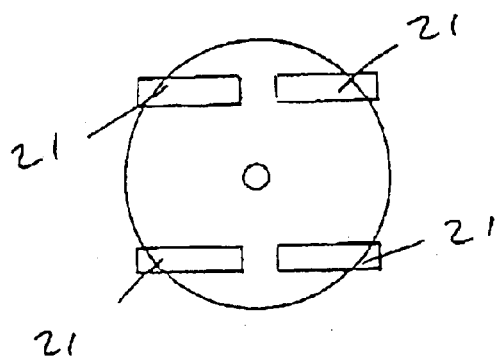
FIG. 6 is an underside view of the robot of FIG. 5.

FIG. 5 shows a side view of a toy robot 20 as it travels in the direction of the arrow along a track segment. FIG. 6 is an underside view of the toy robot. The toy robot 20 is provided with four wheels 21 and means (not shown) for driving the wheels so as to move the toy robot 20. Means may also be provided for turning the wheels so as to steer the toy robot.

Pin 22 projects downwardly from the center of the bottom of the toy robot 20 into a grooved track segment 23. The pin 22 is spring-biased downwardly, but preferably does not quite reach the bottom of the track segment so that unnecessary friction is avoided. Projections 24 from the bottom of the track segment 23 which correspond to the codes are formed with sloping sides so that as the pin 22 contacts a projection 24 it is moved upwardly against the spring-bias, and once the peak of the projection 24 has passed the pin 22 returns under the spring-bias to its lower position. This movement of the pin 22 may be translated by a transducer 25 into an electrical signal. This signal may be processed by computer processing means within the robot, or may be transmitted to a central processing means as will be discussed further below.

In addition to the recognition and identification codes for the track segments, each module is also provided with a checkpoint. This checkpoint is provided at the centre of each module (ie where the track segments meet) so that the toy robot may know that it has reached the center of the module and must make a decision on whether to go straight ahead, turn left or right, or retreat, depending on the type of module and where the toy robot needs to go. This checkpoint may be formed by a further projection or series of projections of a unique nature that tell the toy robot that it has reached the center of the module. It will be understood that this checkpoint allows the robot to confirm and calibrate its position.

It will be understood that the various different types of modules may be assembled into larger environments over which a toy robot may move. The modules may be assembled to create different types of patterns of tracks. These may range maze-like patterns with dead-ends and only a single or few routes through the pattern, to a structure such as that shown in FIG. 7 in which all the modules are cross modules (except for the perimeter modules) and a toy robot can move freely over the entire surface. In passing it should be noted that in an arrangement such as that shown in FIG. 7 where all the modules are identical cross-modules, it may not be necessary to provide (or if provided, it may not be necessary to read) the module identification codes since the robot and/or the control means may already be programmed to know that all the modules are cross-modules and that from the center of one module all four directions are possible.

Figure 7:
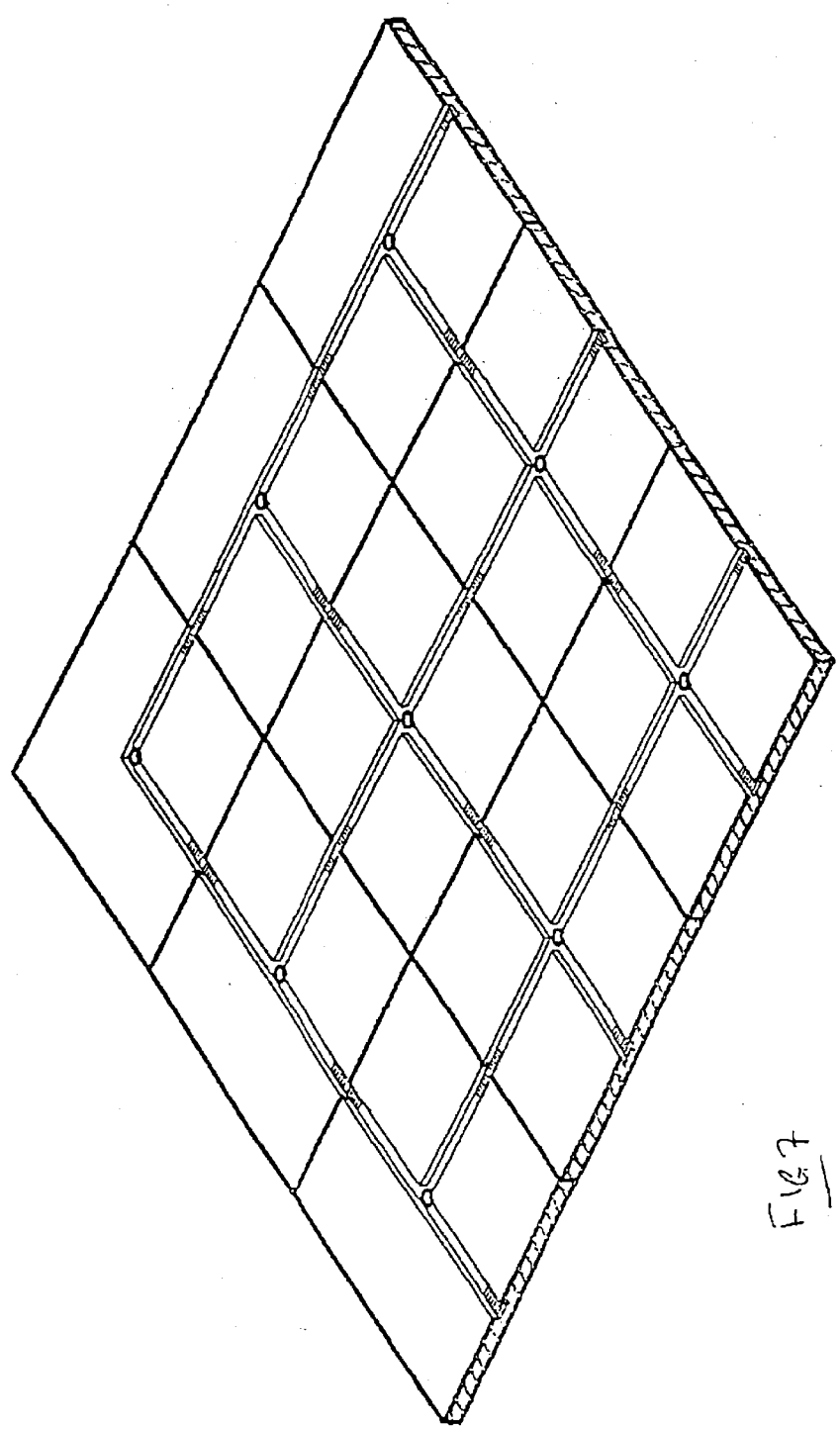
FIG. 7 is a perspective view of an alternative form of environment that may be constructed.

However, with the special exception of FIG. 7, by providing module identification codes that can be read by a toy robot, the robot may know the type and orientation of a module that it is entering and will thus know the options available to it for future directions. The toy robot may know the entire plan of the tracks formed in the environment and may thus plan a route across the environment from a starting position to a desired objective, or alternatively may know nothing of the overall plan and the toy robot may be forced to find a desired objective by a process of iteration.

As mentioned above, the toy robot may be provided with sufficient on-board computer processing capacity to read the codes, identify the type of module encountered and plan the future direction of movement of the toy robot depending on the objective. Such an arrangement would, however, increase the complexity of the toy robots themselves. As an alternative therefore, all data concerning the codes may be transmitted to a central control means either though cables or through wireless means. The central control means may be a dedicated controller or may simply be a personal computer. Using a central control means may be particularly preferred if multiple toy robots are in use at the same time since the central control means may keep track of the relative positions of multiple toy robots.

Figure 8:
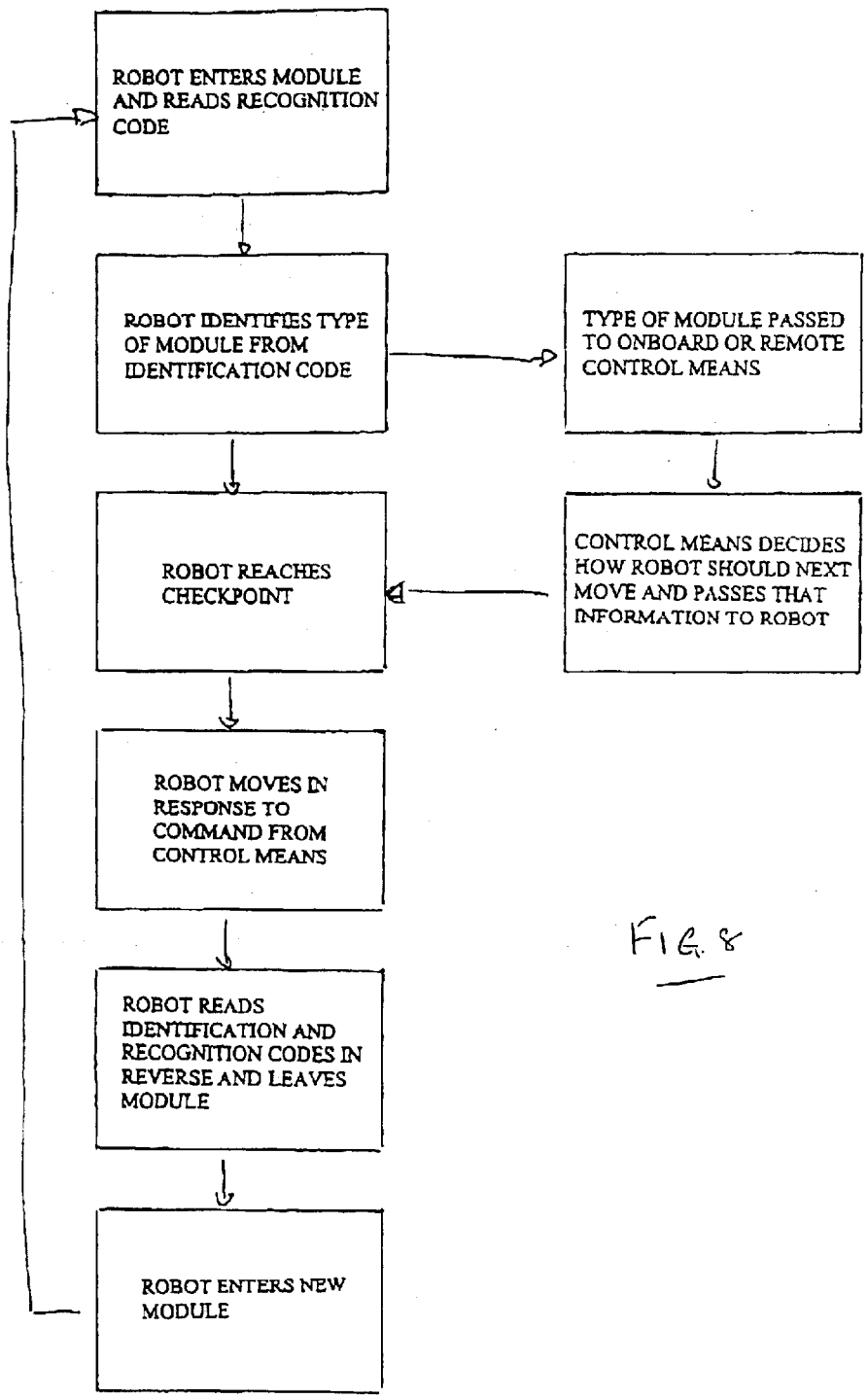
FIG. 8 is a flowchart illustrating the steps that take place as a toy robot moves through one module.

FIG. 8 shows a typical flowchart of the control and navigation of a toy robot in the constructed environment. In the first box the toy robot enters a module. The toy robot reads the recognition code and the module identification code and this information is provided to a control means (either on-board or remote). As the toy robot passes along a track segment and reaches the center of the module it will reach the checkpoint and provide that information to the control means. At the checkpoint a decision is made by the control means on where the robot should move next depending on the type of module, the desired objective, and whatever knowledge the control means has of the overall track structure. The control means will then select a path and provide that information to the drive means of the toy robot which may either go straight forward, turn left or right through 90°, or may reverse. As the toy robot leaves a module that is identified by the fact that the robot will read an identification code (in reverse) and a recognition code and that information is sent to the control means so that if the control means does not already know the complete track arrangement, a map can slowly be built up as the toy robot passes though various modules. This process is then repeated as the toy robot then enters the next module.

It will be understood that this basic invention can be applied in a number of different ways to form different forms of toys and games. For example, as discussed above modules could be assembled in various different ways to create a maze and the objective of the game would be for the toy robot to find its way through the maze to a specific destination. For example in the environment of FIG. 2, an objective could be for the robot to find its way from point A to point B.

It is also possible that more than one toy robot could be provided to increase the number of game-playing options. For example if there were two toy robots, then one could be controlled to chase the other in a "cat-and-mouse" like manner. Alternatively two "teams" of toy robots could be provided that can compete in wargame-like or soccer like games. In such cases the modules could either be assembled to form maze-like track patterns, or simply using cross modules alone to provide a wide range of possible movements for the toy robots as in FIG. 7.

Figure 10:
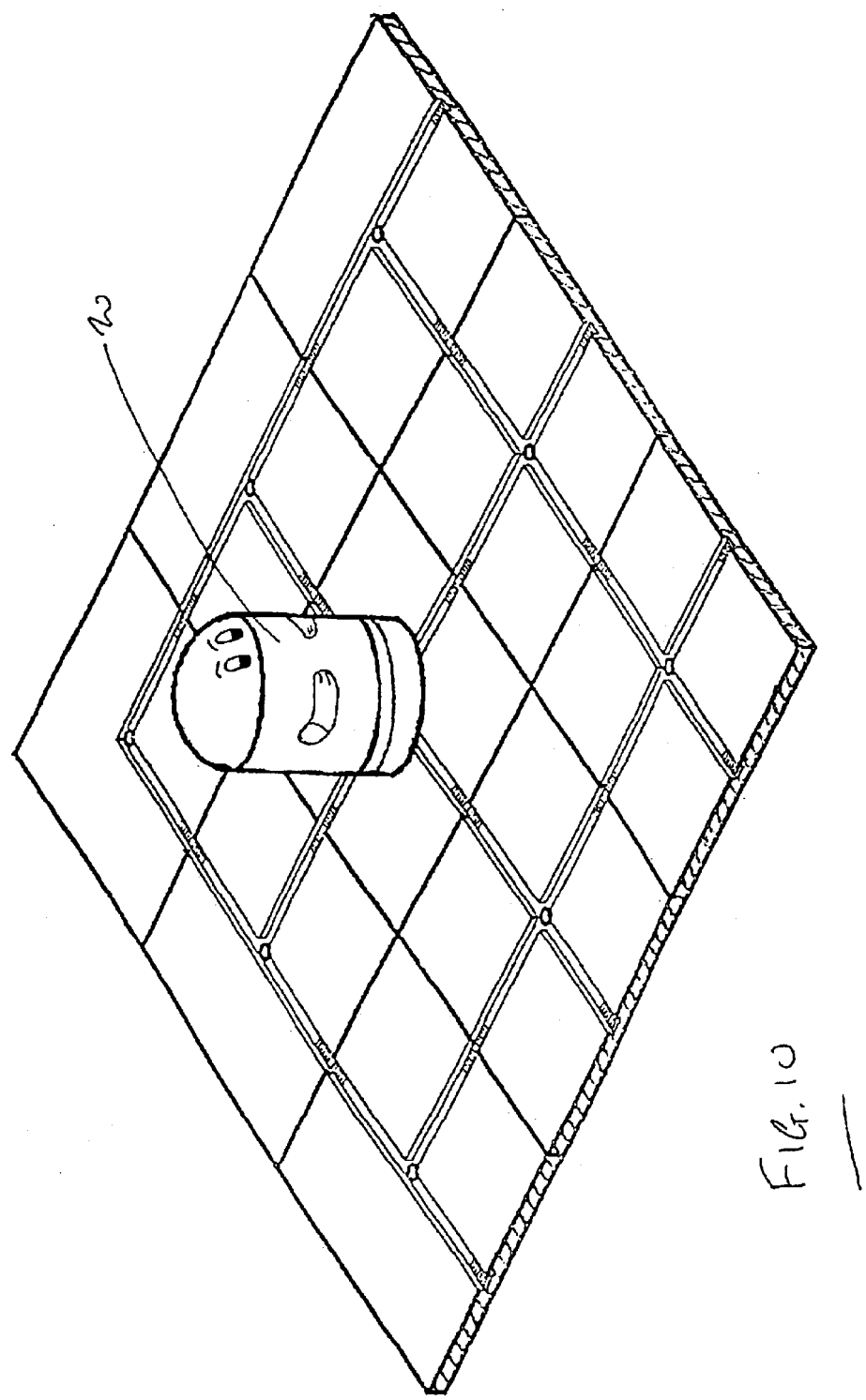
FIG. 10 is a perspective view of an embodiment of the invention showing a toy robot in the constructed environment.

By way of illustration, FIG. 10 shows a complete system with a toy robot 20 located on a surface of the type shown in FIG. 7.

A major advantage of the present invention is that toy robots can move in a controlled manner without requiring great complexity in their design. By forming an environment of a limited number of modules that can be identified by a relatively small number of codes that can easily be read by a toy robot, the need for complex on-board processing or complex visual recognition systems can be avoided and thus the toy robots can be constructed at relatively low cost. At the same time, by re-arranging the modules into different patterns a wide range of types of environments for the robots can be constructed.

What is claimed is:

1. A toy robot system comprising: at least one toy robot and a surface over which said robot is adapted to move, wherein said surface is constructed from a plurality of modules selected from a set of predefined module types including tracks along which a toy robot can move, wherein each said module is provided with identification means readable by said robot that identifies the type of module the robot is entering, a check-point in the center of the module detectable by said robot and control means for controlling said robot in response to the type of module identified by said robot, and wherein at least some of said predefined module types are asymmetrical and wherein said identification means further identifies the orientation of the module.

2. A toy robot system comprising: at least one toy robot and a surface over which said robot is adapted to move, wherein said surface is constructed from a plurality of modules selected from a set of predefined module types including tracks along which a toy robot can move, wherein each said module is provided with identification means readable by said robot that identifies the type of module the robot is entering, a check-point in the center of the module detectable by said robot and control means for controlling said robot in response to the type of module identified by said robot, and wherein each said module is further provided with a recognition code readable by a said robot to indicate to said robot that it is entering or leaving a module.

3. A system as claimed in claim 2 wherein a said identification code is provided associated with each track segment of a module at the end of each said track segment adjacent the edge of said module.

4. A system as claimed in claim 2 wherein each said track segment comprises a groove in a surface of a said module, wherein said identification code comprises a series of projections in said groove, and wherein said toy robot includes a downwardly extending groove following pin means adapted to engage said projections and move vertically in response thereto, a transducer means being provided to convert said movement into an electrical signal.

5. A toy robot system comprising:
at least one toy robot and a surface over which said robot is adapted to move, wherein said surface is constructed from a plurality of modules selected from a set of predefined module types including tracks along which a toy robot can move, wherein each said module is provided with identification means readable by said robot that identifies the type of module the robot is entering, a check-point in the center of the module detectable by said robot and control means for controlling said robot in response to the type of module identified by said robot, and wherein said modules are square and are formed with at least one track segment extending from the centre of said module to a side thereof.

6. A toy robot system comprising:
at least one toy robot and a surface over which said robot is adapted to move, wherein said surface is constructed from a plurality of modules selected from a set of predefined module types including tracks along which a toy robot can move, wherein each said module is provided with identification means readable by said robot that identifies the type of module the robot is entering, a check-point in the center of the module detectable by said robot and control means for controlling said robot in response to the type of module identified by said robot, and wherein said set of predefined types of module comprises five types of module; a first type having a single type, a second type having two track segments arranged in a straight line, a third type having two track segments arranged at right angles, a fourth type having three track segments, and a fifth type having four track segments.

7. A system as claimed in claim 6 including a further type of module having no track and comprising a spacer module.

8. A toy robot system comprising, at least one toy robot and a surface over which said robot is adapted to move, wherein said surface is constructed from a plurality of square modules each said module being formed with at least one track segment along which a toy robot may move, each said at least one track segment extending from the center of said square module to one side of said module, and wherein means are provided readable by said toy robot for indicating when the robot is at the center of a said module.

* * * * *